United States Patent Office 3,428,792
Patented Feb. 18, 1969

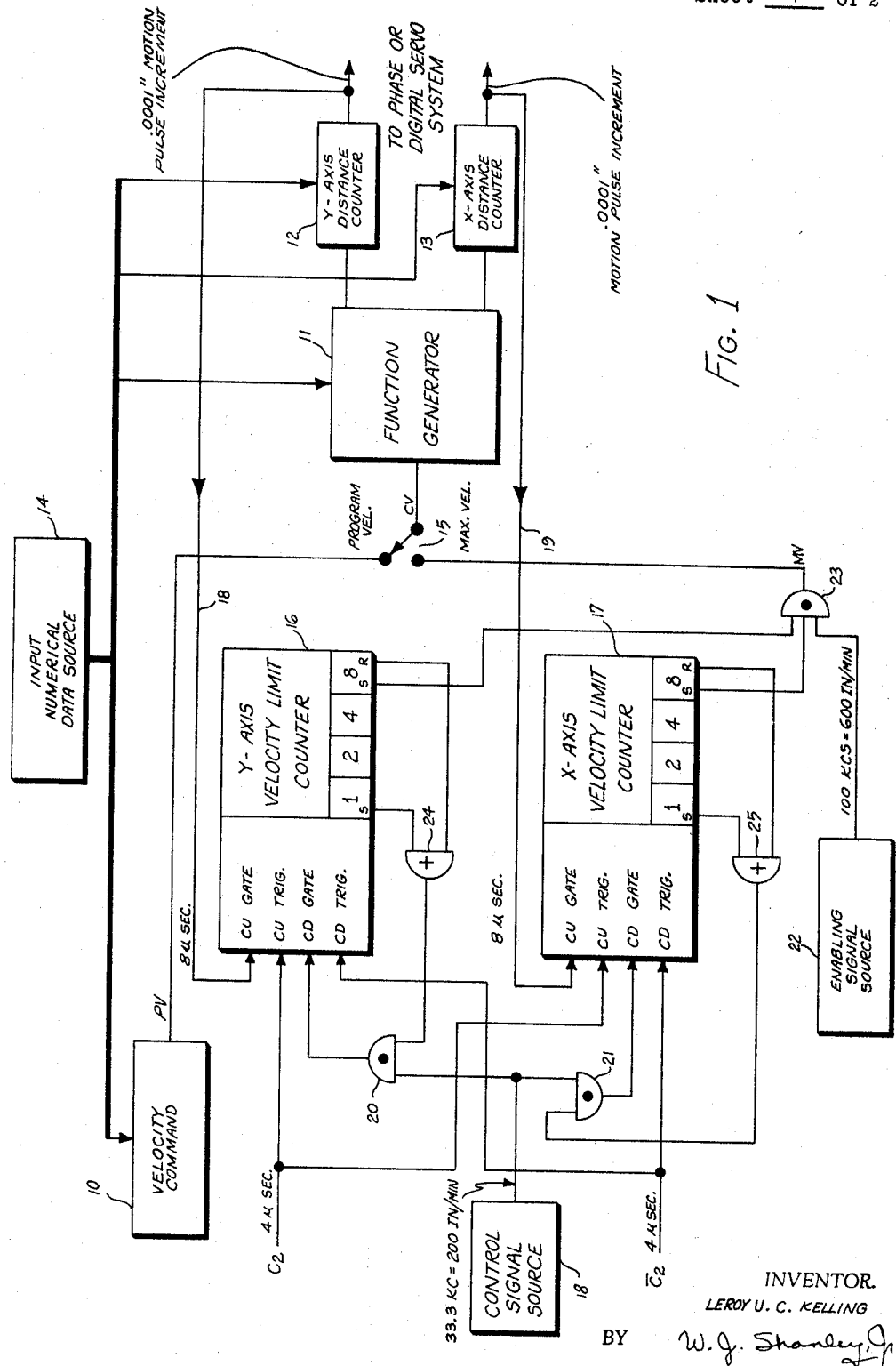

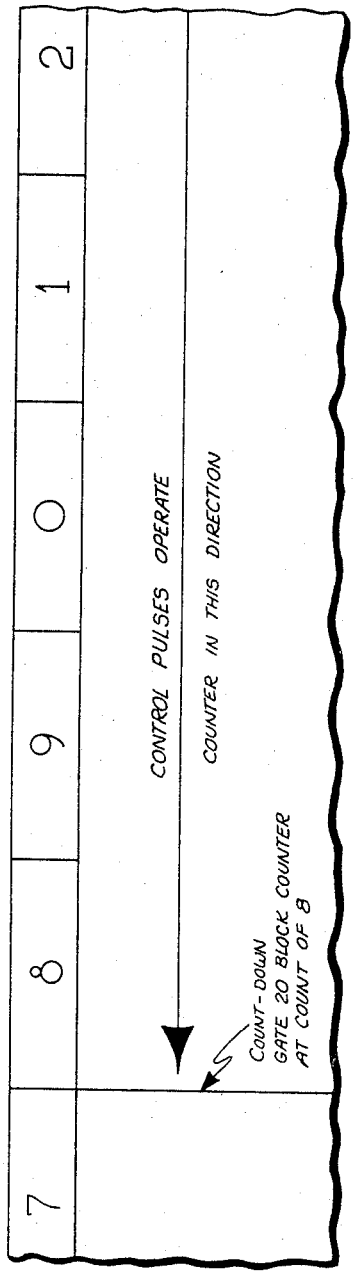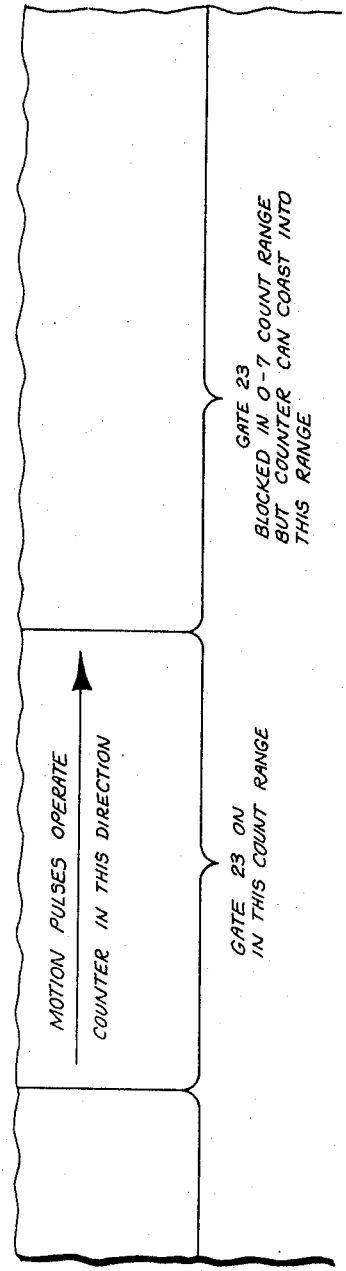

3,428,792
VELOCITY CONTROL SYSTEM
Leroy U. C. Kelling, Waynesboro, Va., assignor to General Electric Company, a corporation of New York
Filed June 21, 1965, Ser. No. 465,425
U.S. Cl. 235—151.11                                   8 Claims
Int. Cl. G06f 15/46; G06g 7/64

ABSTRACT OF THE DISCLOSURE

In accordance with the invention, a feedback controlled velocity regulator circuit is provided to insure that the output pulse rate on each of the axes of a machine can never exceed a selectable maximum velocity rate. This is accomplished by providing a reference or control signal source which provides pulse signals, the rate of which is equal to that which will produce the maximum velocity desired. This control pulse rate is compared with the pulse rate on each output axis of the machine and in accordance with the results of the comparison, the function generator is controlled so as to run at its maximum rate as long as the output pulse rates on each axis are equal to or less than the control pulse rate. However, when such output pulse rates attempt to rise above the control pulse rate, the maximum velocity control circuit functions to periodically turn the function generator OFF and ON so that the output velocity on the highest speed axis will exactly equal the desired maximum velocity.

---

This invention relates to a velocity control circuit for numerical contouring controls, and more particularly to a velocity control circuit which causes the control to run at a preset maximum velocity whenever possible.

Application Ser. No. 426,343, filed Jan. 18, 1965, in the name of the present inventor, entitled "Absolute Feedrate Velocity Control for Multiaxes Pulse Responsive Servo Using All Digital Circuitry" and assigned to the assignee of this application, discloses further embodiments of an arrangement to control the output of a function generator in accordance with control signals. This invention was made subsequent to my present invention and therefore I make no claim herein to this other invention being claimed in application Ser. No. 426,343.

Numerical control drafting machines are commonly utilized for checking numerical control machine tapes for accuracy. When doing so, there is no need to run the control at the slow speed which is normally used for machining operations since in doing so the total length of time for checking the tape is inordinately long. It is not at all uncommon to have machine tapes for controlling three to four hours of machining operations. To check these tapes heretofore required three to four hours of drafting machine time. Since there is no operational need to run the control at the programmed speed, it would be highly desirable to provide a system for checking machine tapes on a numerically controlled drafting machine at a much higher speed than that which was heretofore possible.

It is an object of this invention to provide a new and improved velocity control for a numerical control system which causes the control to run at a given velocity.

It is, therefore, an object of this invention to provide a new and improved numerical control for a drafting machine which causes the control to run at a preset maximum velocity instead of at a lower programmed velocity.

It is another object of the invention to provide a numerical control for a drafting machine which will cause it to run at a speed such that the higher velocity axis will, whenever possible, run at the preset maximum speed.

These and other objects and advantages of the invention will become apparent as this description proceeds with respect to the accompanying drawing in which:

FIGURE 1 is a block diagram of a portion of a numerical control system having a velocity control circuit in accordance with the invention; and FIGURE 2 composed of FIGURE 2a and FIGURE 2b, is a diagram useful in explaining the control circuit of the invention.

In accordance with the invention, a feedback controlled velocity regulator circuit is provided to insure that the output pulse rate on each of the axes of the machine can never exceed a selectable maximum velocity rate. This is accomplished by providing a reference or control signal source which provides pulse signals, the rate of which is equal to that which will produce the maximum velocity desired. This control pulse rate is compared with the pulse rate on each output axis of the machine and in accordance with the results of the comparison, the function generator is controlled so as to run at its maximum rate as long as the output pulse rates on each axis are equal to or less than the control pulse rate. However, when such output pulse rates attempt to rise above the control pulse rate, the maximum velocity control circuit functions to periodically turn the function generator OFF and ON so that the output velocity on the highest speed axis will exactly equal the desired maximum velocity.

Referring now to FIGURE 1, only as much of a prior art numerical control contouring system is illustrated as is necessary to explain how this invention may be applied to such prior art systems. Reference may be had to the numerical control contouring system disclosed in U.S. Patent 3,173,001, issued to J. T. Evans on Mar. 9, 1965, and assigned to the same assignee as this application, for a more complete description of one type of numerical control contouring system with which this invention may be utilized.

It suffices here to say that velocity command 10, function generator 11, and distance counters 12 and 13 are controlled in a well-known manner in accordance with the machine tape which carries the program for controlling the system. This source of input numerical data is represented as source 14. Selector switch 15 provides means for selecting the programmed velocity output signal PV of velocity command 10 as the command velocity signal CV which is applied to drive function generator 11. While operating in this mode, the rate of the motion pulses on the outputs of distance counters 12 and 13 will be controlled by the programmed velocity signal PV in accordance with the data emanating from source 14. Thus, when it is desired that the tool or instrument being controlled by the system is to be run at the program velocity, switch 15 will be placed in its illustrated position. This would be the normal mode of operation where the application requires that the motion along both axes be in accordance with the programmed velocity. If, however, the control is to be run at its maximum velocity, switch 15 will be thrown to its other position where maximum velocity signal MV will be applied to the input of function generator 11.

Y-axis velocity limit counter 16 and X-axis velocity limit counter 17 provide means for comparing the rate of the control signal emanating from source 18 with the rate of the motion pulses at the outputs of distance counters 12 and 13, respectively. These velocity limit counters, which are illustrated as being binary coded decimal counters, are reversible and have their count-up gate inputs connected by conductors 18 and 19 to the outputs of counters 12 and 13, respectively, so as to receive the motion pulses fed back over these conductors. The count-down gate inputs of counters 16 and 17 are coupled to the output of control signal source 18 through AND gates 20 and 21, respectively. This source of control signals is illustrated as providing a 33.3 kc. output signal which, in the commercial embodiment of the invention, provides 200 inches per minute tool motion. However, it should be recognized that by providing a plurality of different selectable control signal rates at the output of source 18, the maximum velocity selected may be varied to suit the particular application.

Enabling signal source 22 provides an enabling signal which, when applied to function generator 11 through gate 23, will cause it to operate at its maximum rate. Depending upon the characteristics of the function generator, the form of the enabling signal will accordingly be dictated. In a commercial embodiment of the invention, a 100 kc. enabling signal, when applied to the input of function generator 11, drives it at or near its maximum rate. This provides a maximum velocity of 600 inches per minute when maximum command numbers are applied to the function generator.

The operation of the maximum velocity control will now be explained. Directing attention first to the Y-axis comparison system, motion pulses fed back over conductor 18 will be applied to the count-up gate input of counter 16. These pulses will be registered in the counter upon the occurrence of the count-up trigger pulses $C_2$ which takes place during the first half cycle of each motion pulse. Thus, the motion pulses will cause counter 16 to count upwardly while the control signal pulses emanating from gate 20, which are applied to the count-down gate input, will cause the counter to count downwardly. The control pulses are registered upon the occurrence of the count-down trigger pulses $\overline{C_2}$. $\overline{C_2}$ occurs during the second half cycle of the motion pulses and thus it will be seen that these trigger pulses are timed so as not to attempt to force the counters to register both count-down and count-up pulses at the same time.

Means is provided by OR gates 24 and 25 for sensing the count in counters 16 and 17, respectively, and in accordance with the count condition sensed for controlling count-down gates 20 and 21 so that they are turned off as the corresponding counter reaches a predetermined count. Thus, these gates prevent the counters from counting downwardly below the predetermined count. In the illustrated preferred embodiment of the invention, gates 24 and 25 are connected to the set side of stage 1 and the reset side of stage 8, thus blocking the associated count-down gate when the count of 8 is reached. Reference to FIG. 2a will illustrate the action of count-down gate 20 with reference to the condition of counter 16.

AND gate 23 provides means for controlling the application of the enabling signal presented at the output of source 22 to the input of function generator 11 in accordance with the count condition of both velocity limit counters. When both counters are in their 8 or 9 count condition, gate 23 will be ON to apply the enabling signal to function generator 11. Referring now to FIG. 2b, it may be seen that the motion pulses tend to operate the counter in the upward direction so that when either counter registers a count of 0, the set output of stage 8 will go to its zero level and gate 23 will be blocked. This will remove the enabling signal from the input of function generator 11 so that function generator 11 will cease to operate when either counter counts above 9. This being the case, motion pulses will no longer appear at the output of counters 12 and 13 and, consequently, counters 16 and 17 will no longer receive count-up pulses on their inputs.

The output of function generator 11 will be in the form of bursts of pulses since the function generator, when enabled, may produce pulses at the outputs of counters 12 and 13, the rates of which exceed the rate of the control signal from source 18. These bursts of pulses will cause counters 16 and 17 to count in the upscale direction to some value such as 1, 2, or 3. This is due to inherent time delays in the circuits and in addition, under certain conditions, a higher rate of signals at the output of function generator 11 relative to the control signal rate will further accentuate this condition. Thus, a few motion pulses may appear on conductors 18 and 19 after gate 23 is blocked. This will cause the counters to coast up beyond the 0 count at which gate 23 blocks. However, the number of pulses that can occur after the blocking of gate 23 will be limited in number so that the counters cannot coast upwardly far enough to reach the count of 7. Thus, ambiguity is obviated.

It will be appreciated that since the count-down input gates continually apply the control pulses to the count-down inputs of the counters as long as the counts are above 8, the control signal pulses will bring the counters down into the count range or keep them in the range in which the function generator is again enabled. The control thus operates as an automatic regulator to keep the output pulse rate at the selected maximum value whenever it is possible to do so with the existing command numbers in the function generator. If at any time it happens that it is not possible to maintain an output rate equal to the control signal rate, the function generator will remain turned on at all times and thus will generate the maximum possible speed it is capable of under such conditions.

While this invention has been described with reference to a specific illustrated embodiment, it will be apparent to those skilled in the art that modifications can be made without departing in spirit from this invention or from the scope of the annexed claims. For example, it will be apparent that the maximum velocity control circuit of this invention can be utilized in a numerical control utilizing a digital pulse servo in addition to the numerical control of the type having a command phase counter and phase analog servo as disclosed in the Evans patent previously cited.

What I claim as new and desire to secure by Letters Patent of the United States is:

1. In a numerical control system having a function generator for resolving a velocity signal into a plurality of output component velocity signals respectively indicative of velocity along a plurality of axes, a velocity control system comprising a signal source for generating a control signal having a predetermined rate, first means coupled to the output of said function generator and said control signal source for comparing the rate of one of said component velocity signals with the rate of said control signal and generating a first periodic signal in response thereto, second means coupled to the output of said function generator and said control signal source for comparing the rate of another of said component velocity signals with the rate of said control signal and generatnig a second periodic signal in response thereto, means responsive to coincidence of said periodic signals for periodically enabling said function generator so that the average rate of the component velocity signal having the higher rate will equal the rate of said control signal.

2. The combination of claim 1 in which said enabling means comprises an enabling signal source, and gating means responsive to coincidence of said periodic signals for coupling the output of said enabling signal source to said function generator to periodically permit it to operate.

3. The combination of claim 2 in which said first and second comparing means each comprises reversible counting means, means associated with each counting means for applying said component velocity signal to operate the associated counting means in a given direction in response thereto, means associated with each counting means for applying said control signal to operate the counting means in a direction opposite to said given direction until it reaches a first predetermined count, and means coupled to each counting means for generating a gating signal during the period when the associated counting means is in a counting range between said first predetermined count and a second predetermined count, said second predetermined count being displaced in the same counting direction as said given direction, said gating signals being coupled to operate said gating means.

4. The combination of claim 3 in which each of said counting means is a reversible counter having a count-up input and a count-down input, each of said component velocity signal applying means being coupled to the count-up input of its associated counter, each of said control signal applying means being coupled to the count-down input of its associated counter whereby said first predetermined count is below said second predetermined count.

5. In combination, a function generator for generating velocity pulses having a rate indicative of velocity along an axis, a velocity control system comprising a signal source for generating control pulses having a predetermined rate, means counpled to said function generator and said control pulse source for comparing the rate of said velocity pulses with the rate of said control pulses to derive comparison pulses, said comparison pulses indicative of whether the control pulse rate is equal or greater than said velocity pulse rate, and means responsive to said comparison pulses indicating that the control pulse rate is equal or greater than said velocity pulse rate for enabling said function generator at a recurrence rate sufficient to control the average rate of said velocity pulses to equal the rate of said control pulses.

6. In combination, a function generator for generating a velocity signal having a rate indicative of velocity along an axis, a velocity control system comprising a signal source for generating a control signal having a predetermined rate, and a reversible counter coupled to said function generator and said control signal source for comparing the rate of said velocity signal with the rate of said control signal to derive a comparison signal, said comparison signal indicative of whether the velocity signal rate is less than said control signal rate, and means responsive to said comparison signal indicating the control signal rate is greater than said velocity signal rate for enabling said function generator at a recurrence rate so that the average rate of said velocity signal will equal the rate of said control signal.

7. In combination, a function generator for resolving a velocity signal into a plurality of output velocity signals having recurrence rates respectively indicative of velocity along a plurality of axes, a velocity control system comprising a signal source for generating a control signal having a predetermined recurrence rate, and a reversible counter coupled to said function generator and said control signal source for respectively comparing the rates of each of said plurality of output velocity signals with the rate of said control signal to derive a plurality of respective comparison signals, said comparison signals indicating the relative rates of each of said velocity signals with respect to the rate of said control signal, means responsive to said comparison signals for enabling said function generator at a recurrence rate sufficient to cause the average rate of the output velocity signal having the higher rate to equal the rate of said control signal to thus cause the axis controlled thereby to move at a velocity which is proportional to said predetermined rate.

8. A regulator for insuring that the output pulse rate of velocity pulses from a function generator on each of the axes of a machine does not exceed a selectable maximum velocity rate comprising a source of control pulses, the rate of which is equal to that which will produce the maximum velocity desired, means for comparing said control pulse rate with the pulse rate of said pulses on each of said axes to provide comparison signals, means for operating said function generator at its maximum rate so long as said pulses on each of said axes are less than the control pulse rate, means responsive to the rate of said pulses on any of said axes exceeding the rate of said control pulses for enabling and disabling said function generator so that the output pulse rate on the highest velocity axis will equal said maximum velocity.

References Cited

UNITED STATES PATENTS

| 3,101,436 | 8/1963 | Younkin | 318—162 |
| 3,206,663 | 9/1965 | Neal et al. | 318—28 |
| 3,351,746 | 11/1967 | Gotz et al. | 235—151.11 |
| 3,286,085 | 11/1966 | Rado | 255—151.11 |

MARTIN P. HARTMAN, *Primary Examiner.*

U.S. Cl. X.R.

235—92; 318—18